United States Patent [19]

Anderson

[11] Patent Number: 5,069,942

[45] Date of Patent: Dec. 3, 1991

[54] PROCESS FOR IMPROVING ADHESION OF POLYSILOXANE COATINGS TO POLYMERIC SUBSTRATES VIA REDUCED ALKALI METAL CATION CONTENT

[75] Inventor: Jerrel C. Anderson, Vienna, W. Va.

[73] Assignee: E. I. Du Pont de Nemours and Company, Wilmington, Del.

[21] Appl. No.: 673,066

[22] Filed: Mar. 21, 1991

Related U.S. Application Data

[63] Continuation-in-part of Ser. No. 516,420, Apr. 30, 1990, abandoned.

[51] Int. Cl.$^5$ ................................................. B05D 3/02
[52] U.S. Cl. .................................... 427/387; 427/393.5; 428/441; 428/447; 428/480
[58] Field of Search ...................... 427/167, 161, 207.1, 427/387, 393.5; 428/441, 447, 480

[56] References Cited

U.S. PATENT DOCUMENTS

| 2,974,105 | 3/1961 | Iler | 252/309 |
|---|---|---|---|
| 3,342,747 | 9/1967 | Mindick et al. | 252/313 |
| 3,525,664 | 8/1970 | Hale et al. | 428/331 |
| 3,644,213 | 2/1972 | Vossos | 252/313 |
| 3,822,216 | 7/1974 | Schaefer | 257/313 |
| 3,867,304 | 2/1975 | Mindick et al. | 252/313 |
| 4,177,315 | 12/1979 | Ubersax | 428/336 |
| 4,348,431 | 9/1982 | O'Malley | 427/387 |
| 4,355,135 | 10/1982 | January | 427/387 |
| 4,469,743 | 9/1984 | Hiss | 428/215 |
| 4,477,528 | 10/1984 | Frye | 427/163 |
| 4,624,870 | 11/1986 | Anthony | 427/387 |
| 4,726,969 | 2/1983 | Baccalon et al. | 427/387 |
| 5,001,011 | 3/1991 | Plueddemann | 428/447 |

FOREIGN PATENT DOCUMENTS 1244745 7/1967 Fed. Rep. of Germany.
81688 4/1983 Romania.

*Primary Examiner*—Michael Lusignan
*Assistant Examiner*—Diana L. Dudash
*Attorney, Agent, or Firm*—James T. Corle

[57] ABSTRACT

A coating process and coating composition are disclosed wherein the coating is a silica sol and a polymerizable silane which have had their alkali metal cation content reduced to prevent blistering and loss of adhesion.

12 Claims, No Drawings

PROCESS FOR IMPROVING ADHESION OF POLYSILOXANE COATINGS TO POLYMERIC SUBSTRATES VIA REDUCED ALKALI METAL CATION CONTENT

CROSS REFERENCE TO RELATED APPLICATION

This application is a continuation-in-part of Ser. No. 07/516,420 filed Apr. 30, 1990 now abandoned.

BACKGROUND OF THE INVENTION

1. Field of the Invention

The present invention relates to a process for improving the adhesion of a polysiloxane coating to a polymeric substrate. Coatings prepared from commercially available silica and organic silanol are effective in providing abrasion resistance, however, it has been found that such coatings tend to develop blisters and lose adhesion under conditions of high humidity and/or exposure to sunlight. In applications where optical clarity is desired, undesirable haze and speckles may develop due to this loss of adhesion between the coating and the substrate. The present invention provides a process for improving the adhesion of polysiloxane coatings to polymeric substrates when exposed to the above-mentioned conditions and products having such improved properties.

2. Prior Art

U.S. Pat. No. 4,177,315 and European Patent Application No. 0157030 describe polysiloxane solution formulations suitable for use in the process of the present invention.

U.S. Pat. Nos. 3,986,997, 4,027,073 and 4,469,743 disclose polyvinyl butyral laminates with polyethylene terephthalate having an abrasion-resistant silanol coating and their preparation.

SUMMARY OF THE INVENTION

The present invention provided a process for improving the adhesion of a polysiloxane coating to a polymeric substrate and products prepared using the process.

Polysiloxane coatings made from a mixture of silica hydrosols and trifunctional silanes provide clarity and good abrasion resistance. Although these coatings possess excellent properties initially, with time they develop blisters and lose adhesion to the substrate, especially under conditions of high humidity and/or exposure to the sun.

I have now discovered that this deterioration in properties is caused by the presence of alkali metal cations from Group 1A metals, usually sodium, which are present in such coatings. The alkali metal cations are contributed by the silica hydrosols which are stabilized by such cations.

The present invention involves the removal of alkali metal cations from polysiloxane coating solutions to provide polysiloxane coatings with markedly improved long-term durability: (1) no blistering, (2) markedly improved adhesion to the substrate, (3) no loss in optical clarity, and (4) no loss in abrasion resistance provided certain measures herein described below are taken.

DETAILED DESCRIPTION

In accordance with this invention, alkali metal cations are removed by ion exchange either (1) on the silica hydrosol before solution preparation, or (2) after the solution has been prepared and aged to promote condensation, or (3) after the hydrosol/silane mixture is hydrolyzed and diluted followed by aging to promote condensation. Of these, alternative (2) is preferred. Solutions made according to (1) do not demonstrate as high a level of abrasion resistance as solutions produced according to alternative (2). Solutions prepared according to alternative (2) demonstrate better abrasion resistance if the solution is coated soon after ion exchange is effected.

The polysiloxane coating compositions treated in accordance with this invention may be prepared by the procedures described in the above-mentioned patents and European Patent Application, the disclosures of which are incorporated herein by reference. Preferably, the coating solution comprises (a) from about 5 to 50 weight percent solids, the solids comprising from about 10 to 70 weight percent silica and from about 90 to 30 weight percent of a partially polymerized organic silanol of the general formula $RSi(OH)_3$, wherein R is selected from methyl and up to about 40 percent of a radical selected from the group consisting of vinyl, phenyl, 3-glycidoxypropyl, and 3-methacryloxypropyl, amino-functional silanes and (b) from about 95 to 50 weight percent solvent comprised of from about 10 to 90 weight percent water and from about 90 to 10 weight percent lower aliphatic alcohol.

The alkali metal cations are removed best by ion exchange techniques. One method is to pass the hydrosol or finished polysiloxane solution through a cation exchange resin in the $H^+$ form to replace the alkali metal ions with an ion which does not cause blistering or adhesion loss. It has been found advantageous to deionize the hydrosol or coating solution using a cationic ion exchange resin in the $H^+$ form and an anionic resin in the $OH^-$ form, either in sequence or as a mixed $H^+/OH^-$ ion exchange bed. Such deionization eliminates both alkali metal cations such as lithium, sodium, potassium, rubidium and cesium and anions such as chlorides and sulfates and replaces them with water. The deionized hydrosols and coating solutions are acidic because of the silanol (silicic acid) groups left on the silica particles. Mixed bed resins perform well. Such mixed beds generally contain the $H^+$ and $OH^-$ resins in a 50/50 ratio, but other ratios can be used for purposes of the present invention. For example, the cation/anion ratio in hydrosols is very high and hence a mixed bed resin higher in $H^+$ resin capacity than 50% is very useful and extends the life of the resin.

The effectiveness of alkali metal cations removal by ion exchange can be monitored by measuring the pH of the hydrosol or polysiloxane solution. Effectively deionized hydrosols will measure 2.5–2.8 in pH and the final coating solutions 3.00–3.55. For certain commercial applications it is generally preferred to adjust the pH upward, i.e. above 6.0, using an alkali metal-free base or basic salt.

Included among the ion exchange resins which may be used in this invention are the strong acid, strong base types. The IONAC® NM-60 and NM-75 grades are identical in compositions, but the NM-75 grade is purified of entrained organics to a greater degree. These grades are a 1/1 mixture of strong acid cationic resin and a strong base anionic resin. The two resins can also be separated from one another and used alone in sequence to deionize the colloidal silica or polysiloxane solutions. Included among other commercially available resins which may be used are strong acid resin types such as DOWEX® 50W-X8 (20–50 mesh, H+ form), DOWEX® 1-X8 (20–50 mesh, strongly basic anionic resin (styrene-divinylbenzene alkyl quaternary amine type), and the similar DOWEX® 2-X8 resin, manufactured by the Dow Chemical Company, and AMBERLITE® IR-120 plus and IR-122 strongly acid cationic resins (styrene-divinylbenzene sulfonic acid type) and AMBERLITE® IRA-400 and IRA-402 strongly basic anionic resins (styrene-divinylbenzene quaternary amine type), and a mixed bed resin, AMBERLITE® MB-1, manufactured by the Rohn and Haas Company.

The cationic resins used and preferred in this invention are strong acid gel forms made of styrene-divinylbenzene copolymer resin with sulfonic acid groups in the acid form, i.e. in the H+ form. The bead size generally used is standard 16/50, although other bead sizes can be used. The cationic resin used in IONAC® NM-60 and NM-75 resins is IONAC® C-267 grade, a strong acid gel type with a copolymer active form of the styrene-divinylbenzene sulfonic acid type in the 16/50 mesh size. This resin is recommended for high purity water applications as well as standard mixed bed and dual bed systems. DOWEX® 50W is a cationic resin of the same type and composition.

The anionic resins preferred are the strong base types with the styrene-divinylbenzene quaternary ammonium copolymer structure. A bead form in the 16/50 mesh size is preferred, but other bead sizes can be used. The resin must be used in the basic, (OH−), form. The anionic resin used in the IONAC® NM-60 and NM-75 grades is IONAC's ASB-1P resin, which is described as a "standard porous anion exchange resin for water demineralization with good resistance to organic fouling." DOWEX® 2-8X is a similar anionic exchange resin. (IONAC is the tradename for ion exchange resins made by the IONAC Chemical Division of the Sybron Corporation.)

The IONAC® NM-60 and NM-75 resins are preferred because they are ultra-high purity resins intended for the semiconductor industry. They do not introduce unwanted organics (such as amines) into the abrasion resistant coating solutions.

The cationic and anionic resins can be used mixed together or can be used separately in sequence. Deionization is preferably accomplished using the mixed resins. It is not always necessary to use an anionic resin, but the solutions or colloidal silicas deionized with both resins are generally more stable and less acidic. In a preferred embodiment of this invention a mixed bed containing a cationic resin in the H+ form and an anionic resin in the OH− form is used to treat the polysiloxane coating composition.

The concentration of non-occluded alkali metal in the dried coating should be below $23 \times 10^{-6}$ mole/g and preferably below $13 \times 10^{-6}$ mole/g to retain good coating adhesion and to minimize blister formation during use. (The concentration in the coating solution in parts per million can be defined by the formula $C \times 10,000 \times M \times P$, where C is the concentration of the alkali metal in the dried coating in moles per gram, M is the atomic weight of the alkali metal and P is the percent solids in the coating solution.) For sodium acetate this amounts to 1,560 ppm in the dried coating or 310 ppm in a 20.0% solids coating bath.

The removal of sodium improves coating durability but it causes a significant change in coating curing performance. The sodium acts as a cure catalyst for polysiloxane coatings, especially when in the form of the basic carboxylates such as sodium acetate, propionate, or formate. However, even in the form of a neutral salt such as the chloride it is an effective catalyst. All the alkali metals as well as Mg and Ca exhibit this catalytic effect when curing the coating. Deionization of the hydrosol or replacement of the sodium with H+ or NH$_4$+ ions gives a final polysiloxane solution that when coated dries at room temperature to a soft and sometimes tacky coating. Even after drying at 100° C. or curing further at 100°–150° C., the coating remains softer than the coating containing sodium ions.

Two approaches have been developed to overcome the lack of an alkali metal salt cure catalyst in the deionized polysiloxane solutions. The first is to produce the polysiloxane solution with the sodium-containing hydrosol, aging it the normal time to fully condense the silanes, and then deionize this solution just prior to coating. Aging is accomplished by maintaining the solution at a temperature from about 5° C. to 80° C. for from 300 to 5 hours. With this approach, the coating cures adequately despite the absence of sodium.

The second approach uses deionization followed by the addition of a cure catalyst at a low enough concentration to prevent blistering and/or adhesion loss. Alkali metal salts, such as sodium acetate and potassium chloride, can be tolerated at low concentrations which catalyze curing without causing blistering or adhesion loss. These catalysts can be added to the deionized polysiloxane solution at $1 \times 10^{-6}$ to $23 \times 10^{-6}$ moles/gram of dried coating with levels below $13 \times 10^{-6}$ moles/gram in the dried coating being preferred.

It has been found that the addition of certain nonalkali metal cations that are not so basic as the alkali metals to deionized polysiloxane solutions can catalyze curing to give coatings that dry hard and show outstanding long-term durability. Cure catalysts which may be used in the coating compositions can vary widely Representative catalysts include the quaternary ammonium salts such as tetramethylammonium acetate, tetrabutylammonium acetate and benzyltrimethylammonium acetate, and tetramethylammonium chloride, and others which act as catalysts that do not cause coating blistering or adhesion loss when used at moderate levels. These catalysts can be added to the deionized polysiloxane solution at concentrations of $1 \times 10^{-6}$ to $48.5 \times 10^{-6}$ moles per gram of dried coating with levels below $20 \times 10^{-6}$ moles per gram of dried coating being most preferred. The formula given above for the alkali metal salt concentration in solution applies for the quaternary salts and any other catalysts as well. These catalysts can be added to the deionized diluted polysiloxane solution at the start or after the aging step. The catalysts are preferably present in a concentration sufficient to provide from about 0.0004 to 5 percent based on the total weight of the cured (dried) coating, and especially from about from about 0.001 to 1.6 percent by weight. The optimum quantity will vary depending on the particular catalyst used with tetrabutylammonium and benzylethylammonium acetate being used in larger amounts than tetramethylammonium acetate.

The present invention finds utility in such applications as anti-lacerative windshields and sidelites for automobiles, all kinds of windows and doors, plastic eye glasses, and even non-optical areas where abrasion resistance is needed such as in appliances, bottles, etc.

The invention is further illustrated by the following specific examples in which parts and percentages are by weight unless otherwise indicated.

EXAMPLE 1

This example compares an acidic polysiloxane coating bath with a standard bath having a pH of 6.2, neither of which has been treated to remove alkali metal cations.

Two coating solutions were prepared. Solution "A" was prepared using LUDOX® LS colloidal silica which had been acidified to pH=3.28 with 6N hydrochloric acid, while Solution "B" was made with LUDOX® LS acidified to pH=4.90 with glacial acetic acid. Each LUDOX® solution was then mixed with two silanes which had been premixed just prior to the addition. The LUDOX®/silane mixtures were stirred at 20° C. until the silanes were hydrolyzed. The two mixtures were then diluted 1:1 with a 2:1 isopropanol-(IPA)/water solution to form the coating solution. The recipes are shown in Table 1:

TABLE 1

| Ingredients | "A" | "B" |
|---|---|---|
| LUDOX LS Colloidal Silica | 110.2 g (pH = 3.28, HCl) | 110.2 g (pH = 4.90, HC$_2$H$_3$O$_2$) |
| Z-6070 Methyltrimethoxysilane (Dow Corning) | 80.8 g | 80.8 g |
| A-187 3-glycidoxypropyltrimethoxysilane (Union Carbide) | 8.4 g | 8.4 g |
| 2:1 isopropanol/ water solution | 199.4 g | 199.4 g |

Each finished solution was coated onto a 4-mil thick flame-treated polyethylene terephthalate (PET) film, dried at room temperature, and then cured in an air oven at 150° C. for 30 minutes. Flame treatment is accomplished using a reducing flame having a high fuel to oxygen ratio. Samples of each coated film were then immersed in boiling water for 2 hours. The boiled samples were inspected for blistering using a differential interference contrast microscope. Both samples blistered heavily. The data are presented in Table 2.

TABLE 2

| Sample | Blister Population Density (number/cm$^2$) | Blister Average Diameter (mm) |
|---|---|---|
| A | 3,760 | 0.075 |
| B | 4,550 | 0.066 |

The solution pH had no effect on blistering nor did the type of acid used.

EXAMPLE 2

This example demonstrates that the use of different carboxylic acids to acidify the colloidal silica does not eliminate the blistering behavior of the subsequent polysiloxane coatings.

Three polysiloxane solutions were made using LUDOX® LS colloidal silica, but each solution used a different carboxylic acid to acidify the colloidal silica prior to polysiloxane solution preparation. In each case, the LUDOX® LS was acidified to a pH of 4.9 before the silane mixture was added. None of the solutions were treated to remove alkali metal ions. The recipes are shown in Table 3.

TABLE 3

| | SOLUTION | | |
|---|---|---|---|
| Ingredients | 2A | 2B | 2C |
| Acid used to adjust ph | Acetic | Propionic | Formic |
| colloidal silica | 110.2 g | 110.2 g | 110.2 g |
| Z-6070 Silane | 80.8 g | 80.8 g | 80.8 g |
| A-187 Silane | 8.4 g | 8.4 g | 8.4 g |
| 2:1 Isopropanol/Water | 190 g | 190 g | 190 g |

Flame treated polyester films were coated with each solution, air dried, and then cured in an air oven at 150° C. for 30 minutes. A sample of each coated film was then immersed in boiling water for 60 minutes. All were inspected for blistering. The results are reported in Table 4.

TABLE 4

| | BLISTER POPULATION AND SIZES | |
|---|---|---|
| Sample | Population Density (no./cm$^2$) | Average Diameter (mm) |
| 2A | 1,690 | 0.084 |
| 2B | 2,810 | 0.063 |
| 2C | 4,306 | 0.078 |

None of the different anions eliminated blistering.

EXAMPLE 3

This illustrates using ion exchange to eliminate ionic sodium from a polysiloxane coating.

LUDOX® AS-40 is a colloidal silica aquasol which contains 40% by weight silica particles measuring 22 nm in average diameter. It is stabilized by ammonium ion but also contains an appreciable amount of sodium ions. Two polysiloxane solutions were made and tested: Solution 3A used LUDOX® AS-40 diluted to 30% solids with deionized water. This diluted sol was adjusted to pH=4.9 with glacial acetic acid just prior to silane addition. The second solution, 3B, used LUDOX® AS-40 also diluted to 30% solids with deionized water, but it was then passed through an ion exchange column filled with Dowex® 50W cationic exchange resin in the H+ form. This was done to eliminate the ammonium and sodium ions from the LUDOX® by exchanging them with hydrogen ions. The pH of the LUDOX® AS-40 dropped from 9.2 to 2.42 after two passes through the Dowex® 50W. The ion-exchanged LUDOX® had a solids content of 23.3% and the amount of silanes used was adjusted appropriately. The recipes are reported in Table 5 below.

TABLE 5

| Ingredients | "3A" | "3B" |
|---|---|---|
| LUDOX AS-40 | 110.2 g (diluted to 30% SiO$_2$ & pH to 4.9 with CH$_3$COOH) | 90.0 g (ion exchanged with Dowex 50W, 23.3% SiO$_2$) |
| Z-6070 Silane | 80.8 g | 51.25 g |
| A-187 Silane | 8.4 g | 5.33 g |
| Isopropanol/Water, 2:1 | 190.0 g | 100.00 g |

The diluted polysiloxane solutions were coated onto 4-mil thick polyethylene terephthalate films, the films were air dried at room temperature and were then cured at 150° C. for 30 minutes. The cured films were immersed in boiling water for 60 and 120 minutes and were then checked for blistering and coating adhesion.

The results are reported below. Coating adhesion was tested using ASTM D3359-83 method using Scotch #600 tape to test adhesion.

TABLE 6

| Sample | Coating Adhesion (% Coating Retained) | | Blistering | |
|---|---|---|---|---|
| | As-Cured | 120-Min. Boil | Population (No./cm$^2$) | Dia. (mm) |
| 3A | 100 | 92 | 2,173 | 0.033 |
| 3B | 100 | 100 | 0 | — |

The control (3A) suffered 8% loss in adhesion and developed a large population of blisters with a two-hour immersion in boiling water. The solution passed through the Dowex 50W to eliminate all Na$^+$ and NH$_4^+$ ions did not develop any blisters or lose any coating adhesion with immersion in boiling water. The elimination of the sodium ions and their replacement with hydrogen ions eliminated blistering and improved coating adhesion to the substrate.

EXAMPLE 4

A polysiloxane solution was made by mixing 322.6 g of LUDOX ® LS colloidal silica hydrosol (adjusted to pH of 4.90 with glacial acetic acid) with a silane mixture composed of 242.4 g of methyltrimethoxysilane (Dow Corning Z-6070) and 24.6 g of 3-glycidoxypropyltrimethoxysilane (Union Carbide A-187). This mixture was allowed to react at 20° C. for several hours until 94% of the Z-6070 silane had hydrolyzed. The solution was then diluted 1:1 with a 2:1 solution of isopropyl alcohol and water. This solution was aged at 20° C. for 64 hours before use. This solution had a pH of 6.44.

A polyethylene terephthalate (PET) film, which had been flame treated to improve adhesion, was coated with the polysiloxane coating to give a final coating thickness of 2–4 micrometers (Sample 4A).

A portion of the polysiloxane solution was next passed through a bed of Dowex ® 50W cationic ion-exchange resin in the H$^+$ form in order to replace all cations in the solution, particularly sodium ions, with H$^+$ ions. The pH of the polysiloxane solution dropped from 6.44 to 2.82 thereby indicating that the intended exchange had taken place. A PET film was coated with this acid solution (Sample 4B).

The remaining acid solution was then passed through an ion exchange column containing Dowex ® 2-8X anionic resin in the OH$^-$ form. The polysiloxane solution changed in pH from 2.8 to 4.25. By passing the polysiloxane solution through the H$^+$ resin and then the OH$^-$ resin, it is deionized. The residual acidity is caused by the silicic acid functionality present on the colloidal silica particles. The solution was also coated onto PET film (Sample 4C).

The starting solution, acid ion exchanged solution and deionized solutions were coated onto flame-treated PET film. The samples were allowed to dry at room temperature and all gave clear coatings measuring 2–4 micrometers in thickness. After air drying, they were heated at 150° C. for 30 minutes for curing. The coatings remained clear and were hard.

The cured samples were immersed in boiling water for one and two hours followed by microscopic and eye inspections and testing of adhesion between the cured coatings and the PET substrate using the ASTM D3359-83 tape test. The samples were also tested for abrasion resistance using the Taber abrasion test. (ANSI Z26.1-1983, Test 34) The results are reported in Tables 7 and 8.

All the coated film samples show equivalent abrasion resistance. After two hours in boiling water, the starting control coating showed massive adhesion loss, whereas the sodium-free (ion exchanged) coatings retained 100% adhesion retention. The control 4(A) sample also experienced massive blister formation with exposure to boiling water, while the sodium-free coatings developed no blisters. Removal of the coating on blistered sample 4A, followed by X-ray microprobe analysis of the deposits remaining in the blister sites on the PET surface, showed unusually high sodium levels to be present.

TABLE 7

| SAMPLE | Polysiloxane Coating Solution Pretreatment | TABER ABRASION RESISTANCE Delta H (%) |
|---|---|---|
| 4A Control | None | 1.5 |
| 4B | H$^+$ Ion-Exchanged | 2.3 |
| 4C | H$^+$ then OH$^-$ Ion-Exchanged (i.e. deionized) | 1.4 |

TABLE 8

| | COATING ADHESION BY TAPE TEST (% Coating Retained) | | | COATING BLISTERING PERFORMANCE After 2 Hrs in Boiling Water | |
|---|---|---|---|---|---|
| SAMPLE | As-Made | 60 Min. Boil | 120 Min. Boil | Blister Population (No./cm$^2$) | Avg. Blister Diameter (mm) |
| 4A Control | 100 | 100 | 20 | 4,196 | 0.079 |
| 4B | 100 | 100 | 100 | None | — |
| 4C | 100 | 100 | 100 | None | — |

EXAMPLE 5

This illustrates using a mixed bed H$^+$/OH$^-$ ion exchange resin system to deionize a polysiloxane coating solution.

A polysiloxane solution was prepared by mixing together 484.8 g of methyltrimethoxysilane and 50.4 g of 3-glycidoxypropyltrimethoxysilane with 661.2 g of LUDOX ® LS which had been adjusted to pH=4.9 with glacial acetic acid. After 4.4 hours of mixing, the silanes were hyrolyzed 100% and the solution was then diluted with 1,200 g of a 2/1 isopropanol(IPA)/water solution. The diluted solution was held at 20° C. for 24 hours before use.

Two ion exchange columns were prepared for use with the polysiloxane solution. One was filled with Dowex ® 50W cationic resin in the H$^+$ form.

The second column was filled with M-614 Mixed Bed Resin" purchased from the J. T. Baker Chemical Co. This resin is a "strong acid-strong base" type, H$^+$/OH$^-$ ionic form, styrene-divinylbenzene matrix, bead form, 16/50 mesh.

Each column was flushed with deionized water and then with a 2/1 IPA/H$_2$O solution in preparation for the polysiloxane solution.

The polysiloxane solution was divided into three portions: (5A) a control portion to be coated onto PET film, (5B) one portion to be ion-exchanged with the Dowex® 50W H+ resin and then coated onto PET film, and (5C) one portion to be deionized by passage through the M-614 mixed bed resin and then coated onto PET film.

The starting (control) polysiloxane solution had a pH of 6.31. Passage through the Dowex 50W resin (portion 5B) dropped the pH to 2.95. Portion 5C dropped from pH=6.31 to pH=3.46 with passage through the M-614 mixed bed resin.

Each portion was coated onto 4-mil polyethylene terephthalate film which had been flame treated to improve wetting and adhesion. Coating was done by hand using an adjustable stainless steel coating bar (The Baker Castor Oil Co., made by Gardner Lab, Bethesda, Md.) set to give a 2-4 micron thick coating after drying. The coated films were hung in a hood at room temperature. After overnight drying, the 5A and 5B coatings had dried hard and clear and the 5C coating was very clear but somewhat softer (later experiments showed that the deionized solutions dried clear and hard once the solution had aged 48 hours or more at 20° C. before ion exchange).

The air dried coated films were then cured at 150° C. for 30 minutes in an air oven. All remained clear and the coatings were very hard. These cured films were then immersed in boiling water for one and two hours followed by inspection for blistering. Adhesion was tested using the tape peel test (ASTM D3359-83) with Scotch 600 tape. Results are shown in Table 9:

TABLE 9

| Polysiloxane Solution | Solution Age @ 20° C. (Hours) | Solution pH | BLISTERING 60-Min. Boil | 120-Min. Boil |
|---|---|---|---|---|
| A | 24 | 6.31 | Heavy | Heavy |
| B | 24 | 2.95 | None | None |
| C | 24 | 3.46 | None | None |

Only polysiloxane solution A, the control solution, gave a coating that blistered with immersion in boiling water.

The use of a mixed bed H+/OH− ion exchange resin was very effective at eliminating the sodium ions from the solution to give a very clear and useful coating that does not blister.

EXAMPLE 6

LUDOX® LS silica hydrosol containing 0.10% of titratable sodium as Na$_2$O was passed through an ion exchange column filled with J. T. Baker Chemical Company M-614 mixed bed resin in the H+/OH− form. The hydrosol pH dropped from 8.01 before ion exchange to 2.67 after ion exchange. This deionized LUDOX® LS hydrosol was used directly to make a polysiloxane solution by mixing 110.2 g of it with 80.8 g of methyltrimethoxysilane (Dow Corning Z-6070 silane) and 8.4 g of 3-glycidoxypropyltrimethoxysilane (Union Carbide A-187 Silane). This mixture was stirred at 20° C. until all the silanes had hydrolyzed and then it was diluted with 200 g of a 2:1 IPA/H$_2$O solution. This diluted polysiloxane solution was then aged at 20° C. for 48 hours to allow the hydrolyzed silanes and the colloidal silica to interact and condense.

The aged solution was then coated onto flame treated PET film to give a 2-micron thick dried coating. This coating remained tacky after air drying at room temperature, thereby indicating the lack of any catalytic effect. Curing at 150° C. for 30 minutes gave a hard and clear coating. Polysiloxane solutions made with the LUDOX® LS still containing its sodium content would dry, hard and clear at room temperature.

The coated film was immersed in boiling water for one and two hours followed by testing for coating adhesion and blistering. Coating adhesion (ASTM D3359-83 tape test—Scotch 600 tape) remained at 100% and no blisters formed.

Deionization of the silica hydrosol before polysiloxane solution preparation does adequately remove the sodium ions to prevent blistering and adhesion loss on the cured coatings, but films formed from the solutions do not cure adequately at room temperature.

EXAMPLE 7

This example demonstrates that films formed from a polysiloxane solution made from deionized LUDOX®LS do not possess good abrasion resistance, but that abrasion resistance improved dramatically by adding sodium acetate or tetramethylammonium acetate to the solution.

LUDOX® LS was deionized by passing it through IONAC® NM-60 mixed bed H+/OH− ion exchange resin. The pH dropped from 8.39 to 2.66. The polysiloxane solution was made by adding a silane mixture of 80.8 g of Dow Corning Z-6070 methyltrimethoxysilane and 8.4 g of Union Carbide A-187 3-glycidoxypropyltrimethoxy- silane to 110.2 g of the deionized LUDOX® LS. This mixture was stirred for four hours at 20° C. in order to hydrolyze the silanes. After the four hours, 200 g of a 2:1 isopropanol/water solution was added to the LUDOX® LS/silane mixture. Also added was four drops of Silwet® L-720 (registered trademark of Union Carbide Corp.) silicone copolymer wetting agent. This diluted solution was aged 48 hours at 20° C. in order to assure condensation of the silanes and LUDOX® LS hydrosol particles. This solution contained 22.6% solids.

The aged solution was divided into three 100 g portions. Portion 7A was used as-is for control purposes. Portion 7B was catalyzed by the addition of 2.63 ml of a 0.1M sodium acetate solution in 2/1 IPA/H$_2$O, and portion 7C was catalyzed by the addition of 2.63 ml of an 0.1M tetramethylammonium acetate solution in 2/1 IPA/H$_2$O. The portions were measured for pH: 7A=3.52, 7B=6.03, 7C=6.14.

Each portion was coated onto flame treated 4-mil thick polyethylene terephthalate film using an 8-in. wide coating bar set to give a final dried coating thickness of 2 microns. The coated films were allowed to air dry in a hood at room temperature for one hour.

Inspection of the air dried coatings revealed the following: Sample 7A was clear, but the coating was soft to the touch, Sample 7B was hard and clear, and Sample 7C was also hard and clear. The absence of a cationic catalyst in Sample A caused incomplete curing during air drying to give the soft coating. The addition of sodium acetate at 210 ppm or tetramethylammonium acetate at 341 ppm ($2.56 \times 10^{-6}$ mole/g for both catalysts) catalyzed curing even at room temperature.

Portions of each sample were then heated at 121° C. and 150° C. for 30 minutes in a hot air oven. These samples were then measured for abrasion resistance using the Taber abrasion test. The results are reported in Table 10.

TABLE 10

| Sample | Cure Temp. (°C.) | Taber Abrasion* Increase in Haze (%) |
|---|---|---|
| 7A | 121 | 17.1 |
| 7B | 121 | 2.1 |
| 7C | 121 | 2.3 |
| 7A | 150 | 6.5 |
| 7B | 150 | 1.9 |
| 7C | 150 | 1.9 |
| Uncoated PET | — | 43.1 |

*CS-10F abrader wheel, 100 revolutions, 500 g weight (ANSI Z26.1-1983, Test 34)

Sample 7A made from deionized LUDOX ® LS has poor abrasion resistance that is affected by cure temperature. The catalyzed samples 7B and 7C show excellent abrasion resistance that is not dependent on cure temperature, thereby indicating effective catalysis.

Polysiloxane coatings made from deionized (sodium-free) silica hydrosol (e.g., LUDOX ®) which is not catalyzed do not develop adequate abrasion resistance even after exposure to high temperatures.

The samples cured at 150° C. for 30 minutes were also tested for coating adhesion and blistering before and after 6-hour immersion in boiling water. The results are shown in Table 11:

TABLE 11

| Sample | Blister Population (No./cm$^2$) | | Coating Adhesion (% Retained) | |
|---|---|---|---|---|
|  | As-Cured | 6-Hour Boil | As-Cured | 6-Hour Boil |
| 7A | 0 | 0 | 100 | 100 |
| 7B | 0 | 210 | 100 | 95 |
| 7C | 0 | 0 | 100 | 100 |

The sodium-free control (7A) develops no blisters and retains 100% coating adhesion. Sample 7B containing added sodium develops blisters and suffers some adhesion loss after the 6-hour boil exposure. The Sample 7C containing the tetramethylammonium acetate catalyst developed no blisters and suffered no adhesion loss. This catalyst worked well and did not develop the problems seen with the sodium catalyst, blistering and adhesion loss.

EXAMPLE 8

A polysiloxane solution was prepared by mixing 661.2 g of LUDOX ® LS (acidified with glacial acetic acid to pH=4.9) with a mixture containing 484.8 g of methyltrimethoxysilane and 50.4 g of 3-glycidoxypropyltrimethoxysilane. After stirring at 20° C. for five hours to hydrolyze the silanes, the mixture was diluted with 1,140 g of a 2/1 mixture of isopropyl alcohol and water followed by the addition of 18 drops of SIL-WET ® L-720 (trademark of Union Carbide Corp.) silicone copolymer wetting agent. This diluted coating bath was aged at 20° C. for 48 hours before use. The bath pH was 6.32, and the solids content was 21.55%.

This polysiloxane solution contained about 210 ppm Na$^+$ (which would give about 975 ppm Na$^+$ in the dried coating) all of which came from the LUDOX ® LS silica hydrosol which contained 0.074% of titratable sodium. The dried polysiloxane coating would contain about $42.4 \times 10^{-6}$ moles of Na$^+$ per gram of coating. Part of the aged polysiloxane coating bath was deionized by passing it through a bed of IONAC ® NM-60 mixed (H$^+$/OH$^-$) ion exchange resin. This caused the pH to drop from 6.32 down to 3.40 thereby indicating complete removal of the free sodium ions.

The deionized coating bath was divided into 50 g and 100 g portions and accurately known amounts of 0.1M NaC$_2$H$_3$O$_2$ solution using a 2/1 isopropyl alcohol/water solvent were added to each portion with vigorous stirring. After adequate mixing, each solution was coated onto flame treated polyethylene terephthalate film using a stainless steel adjustable coating bar. Dried coating thicknesses of 2-4 microns were obtained In the same manner, 0.1M tetramethylammonium acetate solutions were added to the deionized coating bath.

The coated films were allowed to air dry at room temperature and were then cured at 150° C. for 30 minutes. Samples of each film were then immersed in boiling water for 6 hours followed by inspection for blistering and coating adhesion. Blisters were counted using a microscope and coating adhesion was tested by the ASTM D3359-83 method utilizing Scotch #670 tape for the peels. The results are detailed in Table 12.

The starting undeionized bath gave a coating that blistered extensively and retained only 40% of the coating after the tape peel test. The deionized bath gave a coating that did not blister or lose any adhesion at all. The deionized baths containing sodium acetate at less than $2.45 \times 10^{-6}$ moles/g did not blister or lose adhesion. Blistering started at $2.92 \times 10^{-6}$ moles/g and increased some at $3.87 \times 10^{-6}$ moles/g and became much worse at $4.8 \times 10^{-6}$ moles/g. Coating adhesion remained at 100% up to $4.8 \times 10^{-6}$ moles/g, but there it dropped to 40% retention. At all higher sodium acetate concentrations the blistering was extensive and coating retention was poor.

This example establishes an upper limit for sodium ion concentration at about $23 \times 10^{-6}$ moles/g of dried coating and preferably less than about $13 \times 10^{-6}$ moles/g. These limits hold true for all the alkali metals. Similar studies using NaCl showed the same concentration versus blistering and adhesion results. The same type of study using tetramethylammonium acetate showed that it can be used as a curing catalyst in deionized coating baths at much higher molar concentration levels than are possible for the alkali metal salts. For example, at $9.2 \times 10^{-6}$ moles/g in solution ($48.5 \times 10^{-6}$ moles/g on dried coating) little blistering takes place and coating adhesion remains at 100% after immersion for 6 hours in boiling water.

TABLE 12

EFFECT OF SODIUM ACETATE CONCENTRATION ON BLISTERING AND ADHESION IN POLYSILOXANE COATINGS

| Sample No. | (NaC$_2$H$_3$O$_2$) in solution ($\times 10^{-6}$ mole/g) | (NaC$_2$H$_3$O$_2$) in Dried Coating ($\times 10^{-6}$ mole/g) | ADHESION % retained | BLISTERS (No./cm$^2$) |
|---|---|---|---|---|
| 8A | 0 | 0 | 100 | 0 |
| 8B | 0.50 | 2.32 | 100 | 0 |
| 8C | 0.99 | 4.64 | 100 | 0 |
| 8D | 1.48 | 6.96 | 100 | 0 |
| 8E | 1.97 | 9.28 | 100 | 0 |
| 8F | 2.45 | 11.60 | 100 | 0 |

TABLE 12-continued
EFFECT OF SODIUM ACETATE CONCENTRATION ON BLISTERING AND ADHESION IN POLYSILOXANE COATINGS

| Sample No. | ($NaC_2H_3O_2$) in solution ($\times 10^{-6}$ mole/g) | ($NaC_2H_3O_2$) in Dried Coating ($\times 10^{-6}$ mole/g) | ADHESION % retained | BLISTERS (No./cm$^2$) |
|---|---|---|---|---|
| 8G | 2.92 | 13.92 | 100 | 180 |
| 8H | 3.87 | 18.56 | 100 | 537 |
| 8I | 4.79 | 23.20 | 40 | 1,584 |
| 8J | 5.70 | 27.84 | 84 | 1,935 |
| 8K | 9.20 | 46.40 | 64 | 2,098 |
| 8L | 17.0 | 92.81 | 40 | 1,700 |
| 8M* | ca 9.1 | ca 42.2 | 40 | 2,531 |

*This sample is the undeionized starting bath.

EXAMPLE 9

This example illustrates the effects various salts have on polysiloxane coatings that have been deionized before the salt addition.

The polysiloxane solution used in these experiments was prepared as described in Example 8. It was aged at 20° C. for 48 hours and was then stored in a freezer at −15° F. until needed.

The salts were all made into 1.0 molar water solutions which were diluted to 0.1M with a 2/1 isopropyl alcohol/water solution. Each 0.1M solution was added to deionized polysiloxane solution at 5.0 ml to 50 g of polysiloxane solution to give a salt concentration of $9.1 \times 10^{-6}$ moles/g of solution. On the dried polysiloxane coating basis, the concentration amounted to $42.3 \times 10^{-6}$ moles/g of cured coating assuming 21.5% solids in the polysiloxane solutions. This concentration was chosen because it equals the sodium acetate concentration in the starting polysiloxane mother solution (i.e., before deionization).

Each 0.1M salt solution was added at 5.0 ml to 50.0 g deionized polysiloxane solution at room temperature with vigorous stirring. The pH before and after the salt addition was measured and recorded. The polysiloxane mother solution had a pH of 6.20, and with deionization with pH dropped to 3.38–3.43. The polysiloxane solution was deionized with IONAC® NM-60 mixed bed H+/OH− ion exchange resin.

The salt-containing polysiloxane solutions were coated onto flame treated polyethylene terephthalate film using a stainless steel coating bar adjusted to give a 2 micron thick dry coating. The coatings were dried at room temperature, and then one was cured at 121° C. for 30 minutes and another at 150° C. for 30 minutes. The cured coatings were tested for abrasion resistance using the Taber Abrader test (for description, see Example 7). The coated films were also immersed in boiling water for 2, 4, and 6 hours. They were then removed and allowed to dry and sit at room temperature for 24 hours before being tested for blistering and coating adhesion. Coating adhesion was tested using the ASTM D3359-83 tape peel test using Scotch #670 tape. The blistering was measured using a differential interference contrast microscope.

The test results are reported in Table 13.

The catalytic activity of the salts is indicated best by the Taber abrasion results (delta % H: change in haze brought about by controlled abrasion) on the samples cured at 121° C. Curing at 150° C. is more thermally driven whether or not catalysts are present. A delta haze value of 3.0% and below on the 121° C. cured samples indicates catalytic activity.

Coating adhesion was measured on the cured samples after 0, 2, 4, and 6 hour immersions in boiling water. The tape (Scotch #670) peel test (ASTM D3359-83) was used with the coatings unscribed. The adhesion results listed are the % of coating retained by the substrate averaged over the 0, 2, 4, and 6 hour boil results.

Blistering was analyzed on the 121° C. and 150° C. cured samples after immersion in boiling water for 2, 4, and 6 hours. Population densities and average blister diameters were measured.

All the alkali metal salts, $NaC_2H_3O_2$, NaCl, $KC_2H_3O_2$, KCl, $LiC_2H_3O_2$, LiCl, CsBr, and Na[$HOC_6H_4COO$], catalyzed curing, but they caused coating adhesion losses in all cases except one, $KC_2H_3O_2$, and caused blistering in all cases.

The alkaline earth salts that catalyzed curing were $Ca(C_2H_3O_2)_2$ and $BaCl_2$, but both caused severe coating adhesion losses. Both caused blistering. Those that did not catalyze curing were $Ba(NO_3)_2$ and $Mg(C_2H_3O_2)_2$, but both gave good coating adhesion. Both caused blistering.

The two acids tried, HCl and $HC_2H_3O_2$, did not catalyze curing, but adhesion was perfect and no blisters formed. The ammonium ion (from $NH_4^+C_2H_3O_2^-$) also did not catalyze curing but prevented adhesion losses and blistering.

The quaternary ammonium ions all catalyzed curing very well and did not contribute to adhesion losses or blistering. The ones tested were tetramethylammonium acetate (TMAA), benzyltrimethylammonium acetate (BTMAA), and tetrabutylammonium acetate (TBMA). These salts do not exhibit the adverse side effects shown by the alkali and some alkaline earth metal salts.

Other salts that did not catalyze curing were $NiCl_2$ and $Zn(NO_3)_2$. Neither caused adhesion losses or blistering.

Other salts showing slight catalytic effect were $Cu(NO_3)_2$ and $ZnSO_4$. Only the copper salts showed a good balance of properties.

The deionized coating does not cure adequately at 121° C. but does cure adequately at 150° C. It does not lose any adhesion and does not blister. At the higher cure temperatures it gives a superior coating.

The starting polysiloxane solution (before deionization) cures well at all temperatures but suffers adhesion losses and heavy blistering with exposure to boiling water.

This experiment establishes the following:
1. All alkali metal salts catalyze curing but cause adhesion loss and blistering,
2. alkaline earth metal salts do not show an adequate balance of properties for effective use as catalysts, 3. the quaternary ammonium salts catalyze curing nearly as well as the alkali metals and do not cause adhesion losses or extensive blistering,
4. copper salts show slight catalytic power and minimal effects on coating adhesion and do not cause blistering,
5. the hydrogen ion and ammonium ions show no catalytic effect,
6. deionized polysiloxane solutions are excellent if coated within several hours of deionization and if cured at 135° C. or above,
7. polysiloxane solutions made from sodium-containing silica hydrosols cure rapidly, but their coatings blister and lose adhesion rapidly under warm humid conditions.

hours, the solution was chilled to 0° C. for storage. This solution contained 17.6% solids.

The solution was next coated onto flame treated, 4-mil thick polyethylene terephthalate film using a die coater. The coated web was dried at 185°–200° F. (85°–93° C.) in a hot air drying oven and was then wound into a roll.

Three coating states were run: (10A) solution as received out of cold storage (pH=6.20–6.30); (10B) the same solution but deionized by passage through an ion exchange column, containing J. T. Baker Chemical Co. M614 mixed bed $H^+/OH^-$ ion exchange resin, just before the coating die; (10C) the starting solution treated as in (10B) but using Dowex ® 50W cationic exchange resin in the acid ($H^+$) form in the ion ex-

TABLE 13

| Run No. 13 | Solution Description | Salt Added at $9.1 \times 10^{-6}$ mole per Gram of Solution | Solution pH | ABRASION RESISTANCE Taber Delta H (%) | | COATING ADHESION (% Coating Retained) | | BLISTERING WITH 6 Hrs in Boiling $H_2O$ Population/Diameter | |
|---|---|---|---|---|---|---|---|---|---|
| | | | | Cured at 121° C. | Cured at 150° C. | Cured at 121° C. | Cured at 150° C. | (No./cm$^3$) Cured at 121° C. | (mm) Cured at 150° C. |
| 9A | Control | Na$^+$ (already present) | 6.20 | 2.3 | 2.2 | 74 | 81 | 3,675/.068 | 3,517/.090 |
| 9B | Deionized | None | 3.42 | 3.7 | 2.6 | 100 | 100 | 0/— | 0/— |
| 9C | Deionized + Blank | None | 3.46 | 4.0 | 2.2 | 100 | 100 | 0/— | 0/— |
| 9D | Deionized + Salts | LiC$_2$H$_3$O$_2$ | 7.11 | 2.6 | 2.0 | 56 | 73 | 3,077/.109 | 940/.096 |
| 9E | " | LiCl | 3.38 | 2.9 | 2.6 | 25 | 68 | 590/.101 | 268/.149 |
| 9F | " | NaC$_2$H$_3$O$_2$ | 6.96 | 2.5 | 1.5 | 98 | 100 | 3,733/.035 | 3,067/.074 |
| 9G | " | Na Salicylate | 5.51 | 2.8 | 2.2 | 58 | 48 | 2,500/.111 | 407/.184 |
| 9H | " | NaCl | 3.36 | 2.1 | 2.7 | 94 | 100 | 1,370/.062 | 2.162/.0710 |
| 9I | " | KC$_2$H$_3$O$_2$ | 6.93 | 2.4 | 2.3 | 100 | 100 | 764/.081 | 2,157/.0594 |
| 9J | " | KCl | 3.41 | 2.0 | 2.2 | 100 | 94 | 764/.072 | 2,715/.0524 |
| 9K | " | CaBr$_2$ | 3.41 | 2.7 | 2.0 | 88 | 98 | 7,565/.048 | 46,630/.022 |
| 9L | " | Mg(C$_2$H$_3$O$_2$)$_2$ | 7.06 | 3.9 | 2.5 | 100 | 100 | 8/.071 | 0/— |
| 9M | " | Ca(C$_2$H$_3$O$_2$)$_2$ | 7.05 | 3.0 | 2.5 | 51 | 88 | 44,800/.091 | 0/— |
| 9N | " | BaCl$_2$ | 3.38 | 3.0 | 2.8 | 31 | 31 | 3,480/.064 | 35,688/.0281 |
| 9O | " | Ba(NO$_3$)$_2$ | 3.36 | 4.8 | 4.9 | 100 | 100 | 8/.081 | 0/— |
| 9P | " | Cu(NO$_3$)$_2$ | 3.28 | 2.6 | 3.0 | 95 | 100 | 0/— | 0/— |
| 9Q | " | Cu(C$_2$H$_3$O$_2$)$_2$ | 5.59 | 2.4 | 2.8 | 100 | 100 | 0/— | 0/— |
| 9R | " | ZnSO$_4$ | 3.86 | 2.6 | 2.6 | 69 | 48 | 7,420/.037 | 21,600/.0327 |
| 9S | " | AgNO$_3$ | 3.88 | 2.8 | 3.3 | 100 | 100 | 0/— | 0/— |
| 9T | " | NiCl$_2$ | 3.37 | 4.1 | 3.6 | 100 | 100 | 0/— | 0/— |
| 9U | " | FeCl$_3$ + HCl | 2.21 | 2.7 | 1.8 | 83 | 100 | 0/— | 0/— |
| 9V | " | HC$_2$H$_3$O$_2$ | 3.44 | 3.1 | 3.1 | 100 | 100 | 0/— | 0/— |
| 9W | " | HCl | 2.27 | 5.7 | 3.9 | 100 | 100 | 0/— | 0/— |
| 9X | " | NH$_4$C$_2$H$_3$O$_2$ | 6.90 | 4.5 | 3.4 | 100 | 100 | 0/— | 0/— |
| 9Y | " | Tetramethylammonium Acetate | 6.90 | 2.2 | 2.8 | 100 | 100 | 0/— | 0/— |
| 9Z | " | Benzyltrimethylammonium Acetate | 6.92 | 2.4 | 0.9 | 100 | 100 | 737/.044 | 0/— |
| 9AA | " | Tetrabutylammonium Acetate | 7.01 | 3.0 | 2.7 | 100 | 100 | 0/— | 0/— |

EXAMPLE 10

This example illustrates an application of the present invention on a larger scale.

A polysiloxane solution was prepared by mixing 51.5 lbs of LUDOX ® LS colloidal silica sol (acidified to pH=4.90 with glacial acetic acid) with 37.75 lbs of methyltrimethoxysilane and 4.1 lbs of 3-glycidoxypropyltrimethoxy silane. This mixture was stirred in a stainless steel reaction vessel at 20° C. for 5 hours to hydrolyze the silanes. The mixture was then diluted by adding a solution containing 78.0 lbs of isopropyl alcohol and 39.0 lbs of water. Also added at this time was 0.047 lbs of L-720 Silwet ® silicone copolymer wetting agent. The diluted solution was stirred at 20° C. for 96 hours to allow time for continued reaction. After 96 change column. Coated film 10A was the control containing 182 ppm Na$^+$ in the 2-micron thick polysiloxane coating, film (10B) was coated with the freshly deionized coating containing no free Na$^+$ or anions, and film (10C) was coated with the solution containing H$^+$ ions in place of the Na$^+$ ions originally in the coating.

The starting solution pH measured 6.32, but after passage through the deionization bed, it measured 3.23 and after passage through the H$^+$ ion exchange bed, it measured 3.18.

The ion-exchanged solutions performed as well as the starting solution and gave clear and uniformly thick coatings. Most importantly they dried clear and hard in the drying oven to give coated film that did not block when formed into rolls at the coater windup station. These films could be easily unwound from the rolls after months of storage without sticking to adjacent film layers or suffering cracking of the coatings.

This experiment showed that the sodium ion cure agent is not required for rapid curing if the deionization or acid ion exchange occurs soon before coating and drying. Therefore ion exchange on the aged polysiloxane solution is practical on a large scale.

The coated films were analyzed for abrasion resistance, coating adhesion, and blistering propensity. The coated films were further cured by heating in an air oven at 150° C. for 30 minutes. All tests were run on these cured films.

Abrasion resistance was measured using the Taber abrasion tester on the cured films. Blistering was measured on the films after they were immersed in boiling water for 60 and 120 minutes. Coating adhesion was measured on the cured samples before and after immersion in boiling water for 2, 4, and 6 hours.

TABLE 14
COATING RETENTION BY TAPE PEEL TEST (ASTM D3359-83)

| Sample | Sample Description | % Remaining - Unscribed Coating | | | | |
|---|---|---|---|---|---|---|
| | | No Boil | 1-Hr. Boil | 2-Hr. Boil | 4-Hr. Boil | 6-Hr. Boil |
| 10A | Control Coating: (182 ppm Na+) | 100 | 100 | 100 | 10 | 0 |
| 10B | Deionized Coating | 100 | 100 | 100 | 100 | 100 |
| 10C | Acid Ion-Exchanged | 100 | 100 | 100 | 100 | 100 |

TABLE 15
BLISTERING PERFORMANCE

| Sample | Population (No./cm$^2$)/ Avg. Dia. (mm) | | TABER ABRASION RESISTANCE (% Change in Haze) |
|---|---|---|---|
| | 1-Hour Boil | 2-Hour Boil | |
| 10A | 2,980/0.043 | 2,980/0.049 | 0.7 |
| 10B | 0/— | 0/— | 3.5 |
| 10C | 0/— | 0/— | 2.8 |

EXAMPLE 11

This example illustrates the superiority of deionized and acid ion-exchanged polysiloxane coatings in accelerated outdoor exposure.

The polysiloxane coated films 10A, 10B, and 10C produced on a large scale coating line (see Example 10) were laminated to glass and were then exposed to the EMMA ® accelerated weathering test at DSET Laboratories, Inc. at Phoenix, Ariz. The EMMA ® test is an accelerated sunshine exposure test where the sample is irradiated by sunshine concentrated by a parabolic mirror that is driven to maximize solar radiation throughout the day. EMMA ® is the registered trademark for the DSET test which meets ASTM D4141:C requirements.

The coated films were laminated to glass using BUTACITE ® (E.I. du Pont de Nemours and Company's trademark for its polyvinyl butyraldehyde (PVB) sheeting, 15-mils (0.038 cm) thick. The PVB sheeting was laid on top of a 12"×12" (30.48×30.48 cm) sheet of ⅛" (0.3175 cm) thick float glass and then the polysiloxane coated polyethylene terephthalate film was laid on the PVB with the coated side facing upward. Next another 12"×12" (30.48×30.48 cm) sheet of float glass was laid on top of the film to act as a coverplate to assure a flat and wrinkle-free surface on the coated film. This sandwich structure was then placed in a polyester bag, evacuated of air and then heat-sealed while still under vacuum. This bagged laminate was then placed in an autoclave under pressure for 30 minutes and heated to 150° C. The bag was then removed, opened, and the coverplate removed to give a glass/PVB/film laminate having very good clarity, low haze, and good flatness.

These laminates were positioned in the EMMA apparatus so that the glass side faced the sun and the film side faced the inside of the hollow apparatus that had air passing through it for cooling purposes.

Samples were returned after 240,000, 480,000, 720,000 and 888,000 Langleys (lys) of exposure. A Langley=0.04184MJ/m$^2$. The exposed samples were tested for: (1) coating adhesion using the tape peel test (ASTM D3359-83, Scotch #600 tape), (2) blistering, (3) abrasion resistance by the Taber Abrasion test (ASTM D 1044-82). The results are given in Tables 17, 18 and 19.

The control (11A) maintained good abrasion resistance through 720,000 lys of exposure as did the deionized laminate (11B). The acid ion-exchanged sample (11C) lost its abrasion resistance with 480,000 lys exposure.

Coating adhesion retention was 100% through 720,000 lys for the deionized coating (11B), but the control (11A) and H+ ion-exchanged (11C) samples experienced major losses in adhesion between 240,000 and 480,000 lys of exposure.

Blistering was present on Samples (11A) and (11C) with (11A) showing heavy blister populations at all exposure conditions. The deionized sample (11B) developed no blisters at any of the exposure conditions.

These results show that deionization of the polysiloxane solution gives a coating with outstanding abrasion resistance and resistance to blistering, and very importantly it greatly improves coating adhesion performance in accelerated aging testing. The elimination of cations (sodium) and anions from the polysiloxane solution greatly improves the coating long term durability.

TABLE 16
EFFECT OF ACCELERATED SUN EXPOSURE ON POLYSILOXANE COATED GLASS/PET LAMINATES

| Sample No. | Description | TABER ABRASION RESISTANCE Change in Haze (%) | | | |
|---|---|---|---|---|---|
| | | Unexposed | 240K Lys | 480K Lys | 720K Lys |
| 11A | Control - 210 ppm Na+ | 1.7 | 1.3 | 1.2 | 1.8 |
| 11B | Deionized - No Na+ | 1.7 | 1.3 | 1.1 | 1.7 |
| 11C | H+ Ion-Exchanged | 1.6 | 1.5 | 4.5 | 7.5 |

TABLE 17
POLYSILOXANE COATING ADHESION
% Retained
(Scotch #600 Tape)

| Sample No. | Unexposed | 240K Lys | 480K Lys | 720K Lys |
|---|---|---|---|---|
| 11A | 100 | 98 | 35 | 0 |
| 11B | 100 | 100 | 100 | 100 |
| 11C | 100 | 100 | 20 | 20 |

TABLE 18
BLISTERING PERFORMANCE
Population (No./cm$^2$/Diameter (mm))

| Sample No. | 240K Lys | 480K Lys | 720K Lys |
|---|---|---|---|
| 11A | 109/.068 | 165/.057 | 205/.115 |

TABLE 18-continued

| | BLISTERING PERFORMANCE Population (No./cm²/Diameter (mm)) | | |
|---|---|---|---|
| Sample No. | 240K Lys | 480K Lys | 720K Lys |
| 11B | 0/— | 0/— | 0/— |
| 11C | 0/— | 3.5/.058 | 8/.064 |

EXAMPLE 12

In this example a polysiloxane abrasion resistant coating (PARC) solution is deionized followed by addition of tetramethylammonium acetate (TMAA) to give a TMAA concentration of 400 ppm in the final solution. The final solution pH was 6.29. It was done on a large scale and the catalyzed solution was coated on a large scale coater.

A 760-lb batch of polysiloxane solution made according to the recipe used in Example 10 was used for this experiment. The solution contained sodium ion at a concentration of 210 ppm and had a pH of 6.24. The solution was aged with slow stirring at 20° for 96 hours.

The solution was deionized after 96 hours of aging by pumping it through two ion exchange columns in series containing IONAC ® NM-60 mixed bed H+/OH− ion exchange resin. The pumping rate was 145 pph.

The deionization dropped the pH from 6.24 to 3.43. The 760 lbs of deionized solution was stirred gently and 2,577 grams of a 5.41% tetramethylammonium acetate solution in a 2/1 isopropanol/water solvent mixture was added slowly. After the TMAA solution was added, the PARC solution pH measured 6.29. The TMAA concentration was 400 ppm in solution and 2,270 ppm on the solids. This solution was stirred for one hour and was then filtered and chilled to 32° F. to quench the aging process. The chilled solution was coated later after several days storage at 32° F.

The solution was coated onto flame-treated PET film using a slot die coater. The coated film web was dried in a hot air oven at 90° C. to give a clear and hard coating. Also coated in the same way were the starting polysiloxane solution containing 210 ppm Na+ (1,193 ppm Na+ in dried coating) and the deionized solution containing no sodium or TMAA catalyst. All gave hard coatings.

These coated films were laminated to glass in an autoclave for 30 minutes using BUTACITE ® PVB 15-mil (0.038 cm) sheeting as the adhesive (see Example 11 for process description). These glass laminates were tested for abrasion resistance (Taber test) and were also immersed in boiling water for 2, 4, and 6 hours followed by testing for coating adhesion (Tape Test) and blistering. The results are shown in Tables 19 and 20.

The deionized and TMAA-catalyzed coatings show much better adhesion than the control coating containing 1,193 ppm Na+ (210 ppm Na+ in starting solution) and did not develop blisters whereas the starting solution coating developed about 200 blisters per cm² at all the boil times.

The Taber abrasion resistance results are shown in Table 20. The control coating (Na+) and the TMAA-catalyzed coating both show good abrasion resistance at both cure temperatures, whereas the deionized coating abrasion resistance shows some dependence on cure temperature, with the 150° C. cure giving the better value. The TMAA catalyzes the cure (hardening) of the PARC and removes the need for higher cure temperatures and, unlike sodium, it does not cause blistering.

TABLE 19

| Sample | Abrasion Resistance Delta H (%) | COATING ADHESION (% RETAINED) | | | | | BLISTER POPULATION (No./cm²) | | |
|---|---|---|---|---|---|---|---|---|---|
| | | No Boil | 2-Hr Boil | 4-Hr Boil | 6-Hr Boil | Sum | 2-Hr Boil | 4-Hr Boil | 6-Hr Boil |
| Starting Solution 210 ppm Na+ | 2.5 | 100 | 95 | 60 | 0 | 255 | 176 | 208 | 203 |
| Deionized Solution | 1.9 | 100 | 100 | 100 | 60 | 360 | 0 | 0 | 0 |
| Deionized Solution Plus 400 ppm TMAA | 1.4 | 100 | 100 | 100 | 100 | 400 | 0 | 0 | 0 |

TABLE 20

| Sample | Cure Temp. (°C.) | Abrasion Resistance Delta H (%) |
|---|---|---|
| Starting Solution 210 ppm Na+ | 121 | 1.7 |
| | 150 | 2.1 |
| Deionized Solution | 121 | 3.4 |
| | 150 | 2.4 |
| Deionized Solution plus 400 ppm TMAA | 121 | 1.7 |
| | 150 | 2.1 |

EXAMPLE 13

A polysiloxane solution was made by mixing 186.0 lbs. of LUDOX ® LS colloidal silica sol (acidified with acetic acid) and 137.0 lbs. of methyltrimethoxysilane (Dow-Corning Z-6070 silane) and 14.8 lbs. of 3-glycidoxypropyltrimethoxysilane (Union Carbide A-187 silane). This mixture was stirred slowly at 20° C. for 5 hours until the silanes were 95% hydrolyzed. It was then diluted with 422 lbs. of a 2/1 mixture of isopropyl alcohol and water followed by one hour of stirring. This diluted polysiloxane solution was then deionized by passing it through a mixed bed ion exchange resin IONAC ® NM-60). Part of the solution was not deionized (Part A), and it served as the control. The deionized solution was split into two portions, and to one was added tetramethylammonium acetate as a 5% solution in 2/1 isopropanol/water and to the other was added sodium acetate, also as a dilute solution in IPA/H₂O solvent. Sufficient amounts of the two catalysts were added to give 360 ppm tetramethylammonium acetate in the one solution (Part B) and 110 ppm sodium acetate in the other solution (Part C). All three solutions were aged with slow stirring at 20° C., for 96 hours. They were then coated onto polyethylene terephthalate (PET) film which had been flame treated to make it more adherable and wettable to the polysiloxane solution. The coated web was dried at 105° C.

Another polysiloxane solution was made for control purposes using the same formula as above but with one difference in procedure. The solution was mixed, hydrolyzed, diluted, and was then aged at 96 hours at 20° C. After this aging, it was then deionized followed by addition of tetramethylammonium acetate to give 360 ppm in the final solution was labelled Part D. It too was coated as described for Parts A, B, and C.

The coated films were laminated to plate glass using 15 ml BUTACITE® polyvinylbutyral sheeting between the coated film and the glass. The laminates were autoclaved under pressure in polyester bags for half an hour at three temperatures: 121°, 135°, and 150° C. The films were laminated with the polysiloxane coatings on the outside of the laminate and the uncoated sides in contact with the BUTACITE® sheeting. All the laminates were clear and free of distortions.

Each laminate was tested for abrasion resistance using the Taber abrader test. Laminates were also tested for coating adhesion before and after immersion in boiling water for 6 hours. The boiled samples were also inspected, using a microscope, for blister formation. The results are give in Table 21 below:

TABLE 21

| Sample | Taber Abrasion Haze Increase (%) | | | Coating Adhesion (% retained) (6 hour water boil) | | | Blistering (No./cm$^2$) (6 hour boil) | | |
| --- | --- | --- | --- | --- | --- | --- | --- | --- | --- |
| | 121° C. | 135° C. | 150° C. | 121° C. | 135° C. | 150° C. | 121° C. | 135° C. | 150° C. |
| A | 1.2 | 1.0 | 0.9 | 0 | 0 | 0 | 4,890 | 3,367 | 4,380 |
| B | 1.7 | 1.4 | 1.5 | 100 | 100 | 100 | 0 | 0 | 0 |
| D | 1.9 | 1.1 | 1.1 | 100 | 100 | 100 | 0 | 0 | 0 |
| C | — | 1.2 | 1.4 | 100 | 75 | 100 | 0 | 36 | 0 |

All the coatings provide good abrasion resistance to the PET film. The uncoated PET film has a Taber abrasion change in haze of 20–40%. All the samples show 100% adhesion retention before their exposure to the boiling water. Sample A, the control that was not deionized, shows extremely poor adhesion and develops excessive numbers of small blisters with exposure to boiling water for 6 hours. Samples B and D, deionized and then catalyzed with 360 ppm tetramethylammonium acetate, both show perfect adhesion retention and no blisters after the six hours in boiling water. The point at which deionization and addition of catalyst takes place had no affect on the properties, i.e. deionized/catalyzed before or after solution aging for 96 hours.

Sample C, which contains 110 ppm sodium acetate, displays good properties, but some deterioration in adhesion and blister resistance took place. Compared to Sample A, which contains about 750 ppm sodium acetate, Sample C performs much better.

Deionizing the polysiloxane solutions to remove all the sodium and other cations and anions followed by addition of the desired cure catalyst at appropriate concentrations provides good abrasion resistance and prevents adhesion loss and blister formation. This deionization/catalyzation can be done any time during the polysiloxane solution aging process without deteriorating the durability of the subsequent cured coating.

Other adhesives in addition to polyvinylbutyral such as polyurethanes may be used in preparing laminates using the coated substrates prepared as described herein. The surfaces of the materials to be laminated may or may not be coated with a primer. In laminating coated films of this invention to glass when using a polyurethane adhesive, it has been found to be advantageous to prime the glass surface with an amino silane primer such as Dow Corning's Z-6020, N-(2-aminoethyl)-3-aminopropyl trimethoxysilane.

EXAMPLE 14

A polysiloxane solution made as described in Example 10 was aged at 20° C. for 96 hours followed by deionization and catalyzation with 400 ppm tetramethylammonium acetate. This solution was coated onto 7 mil PET film which had been flame treated to enhance coating adhesion and was dried at about 100° C.

The polysiloxane coated PET film was laminated to glass using the process described in Example 11, but instead of using polyvinylbutyral resin as the melt-activated adhesive, an aliphatic polyurethane resin was used. The lamination was carried out in an autoclave using a 30 minute cycle with a peak temperature of 135° C..

The aliphatic polyurethane resin used was 0.025 inch thick K-PUR® 301 Thermoplastic Aliphatic Polyether Urethane film manufactured by K-S-H® Inc. of St. Louis, Mo. Supplied with the film were two K-PUR® primer solutions, one being recommended as a primer for glass and the other as a primer for acrylic sheeting.

Three glass laminates were prepared: Laminate 1 using no primer, Laminate 2 applying the primer recommended for glass to the surfaces of a glass sheet and a PET film, and Laminate 3 applying the primer recommended for acrylic sheeting to the surface of a PET film and the primer recommended for glass to the glass sheet. The primers were applied to the surfaces of the glass and PET film, which in the laminate will be adjacent to the polyurethane (PU) film when the laminate was formed, using a lint-free cloth followed by removal of any excess primer with another dry lint-free cloth.

The finished glass/PU/PET laminates were clear, colorless and tightly bonded together. The polyurethane film could not be peeled from the glass by hand nor could the PET film, primed with either the glass or acrylic recommended primer, be peeled from the polyurethane film. The peel strengths for the PET/PU bonds, in lbs/inch, for each of the three laminates were measured with the results being given in Table 22.

The laminates were also evaluated for (1) abrasion resistance using the Taber Abrader (ANSI Z26.1-1983, Test 34), (2) polysiloxane coating adhesion (ASTM D3359-83, tape peel test) both before and after immersion in boiling water for 6 hours, and (3) blistering after 6 hour immersion in boiling water. Scotch brand No. 670 tape was used for the tape peel testing. The results of the tests are tabulated in Table 22.

TABLE 22

| Laminate Number | Abrasion Resistance (% Haze) Increase | Coating Adhesion % of Coating Retained | | Blisters (No/cm$^2$) | Peel Strength (lb/in) |
| --- | --- | --- | --- | --- | --- |
| | | No Boil | 6 Hr. Boil | | |
| 1 | 1.1 | 100 | 100 | 0 | 5.1 |
| 2 | 1.3 | 100 | 100 | 0 | 12.9 |
| 3 | 1.6 | 100 | 100 | 0 | 11.4 |

The glass laminates utilizing polyurethane rather than polyvinylbutyral resin as the bonding resin between the polysiloxane coated PET film and the glass perform in equivalent fashion to those made using the polyvinylbutyral resin as the bonding resin.

I claim:

1. A process for improving the adhesion of a polysiloxane coating to a polymeric substrate which comprises treating a coating solution comprised of silica and organic silanol with a cationic exchange resin to remove alkali metal cations, coating at least one surface of said polymeric substrate with said treated coating solution, and thereafter curing said coating at an elevated temperature.

2. The process of claim 1 wherein the coating solution is treated in sequence with a cationic exchange resin and an anionic exchange resin.

3. The process of claim 1 wherein the coating solution is treated with a mixed H+/OH− ion exchange resin.

4. The process of claim 3 wherein said treated coating solution is aged at a temperature from about 5° C. to 80° C. for a period from about 5 to 300 hours prior to coating.

5. The process of claim 4 wherein after aging an alkali metal-free curing catalyst is added to the treated coating solution in an amount sufficient to provide from about 0.0004 to 5 percent by weight based on the total weight of the cured coating.

6. The process of claim 3 wherein said treated coating solution comprises
(a) from about 5 to 50 weight percent solids, the solids comprising from about 10 to 70 weight percent silica and from about 90 to 30 weight percent of a partially polymerized organic silanol of the general formula RSi(OH)$_3$, wherein R is selected from methyl and up to about 40 percent of a radical selected from the group consisting of vinyl, phenyl, 3-glycidoxypropyl, and 3-methacryloxypropyl and
(b) from about 95 to 50 weight percent solvent comprised of from about 10 to 90 weight percent water and from about 90 to 10 weight percent lower aliphatic alcohol.

7. The process of claim 6 wherein said polymeric substrate is a polyethylene terephthalate film.

8. The process of claim 7 wherein the coated polymeric substrate is bonded to a sheet of plasticized polyvinyl butyral film at elevated heat and pressure.

9. The process of claim 3 wherein said treated coating solution contains less than 0.23×M×P parts per million alkali metal cations, where M is the atomic weight of the alkali metal and P is the percent solids in the coating solution.

10. The process of claim 1 wherein said coating solution is treated with a cationic exchange resin just prior to coating.

11. A process for preparing a laminate comprising:
(a) coating at least one side of a polyethylene terephthalate film to a thickness of about 1 to 20 microns with an organic silanol coating composition comprising:
(i) about 5 to 50 weight percent solids, the solids comprising about 10 to 70 weight percent silica, up to about 20 weight percent of a partially polymerized epoxy functional silanol, and about 30 to 90 weight percent of a partially polymerized organic silanol of the general formula RSi(OH)$_3$, wherein R is selected from methyl and up to about 40 percent of a radical selected from the group consisting of vinyl phenyl, 3-glycidoxypropyl, and 3-methacryloxypropyl, the solids content of said coating composition containing less than 0.23×M×P parts per million alkali metal cations, where M is the atomic weight of the alkali metal and P is the percent solids in the coating solution;
(ii) about 95 to 50 weight percent solvent, the solvent comprising about 10 to 90 weight percent water and about 90 to 10 weight percent of a lower aliphatic alcohol, and
(b) curing the coating by heating at an elevated temperature.

12. The process of claim 11 wherein the coating composition contains an alkali metal-free curing catalyst in an amount sufficient to provide from about 0.0004 to 5 percent by weight based on the total weight of the cured coating.

* * * * *